United States Patent [19]

Kodama et al.

[11] Patent Number: 5,456,234
[45] Date of Patent: Oct. 10, 1995

[54] FUEL PUMP CONTROL SYSTEM FOR INTERNAL COMBUSTION ENGINE

[75] Inventors: Hiroki Kodama; Shinichi Kitajima, both of Wako, Japan

[73] Assignee: Honda Giken Kogyo Kabushiki Kaisha, Tokyo, Japan

[21] Appl. No.: 223,821

[22] Filed: Apr. 6, 1994

Related U.S. Application Data

[63] Continuation of Ser. No. 968,889, Oct. 30, 1992, abandoned.

[30] Foreign Application Priority Data

Nov. 1, 1991 [JP] Japan .................................. 3-313537

[51] Int. Cl.⁶ .................................................. F02M 37/04
[52] U.S. Cl. ............................................ 123/497; 123/1 A
[58] Field of Search ................................ 123/497, 499, 123/1 A, 494

[56] References Cited

U.S. PATENT DOCUMENTS

| | | | |
|---|---|---|---|
| 4,284,053 | 8/1981 | Merrick | 123/497 |
| 4,359,984 | 11/1982 | Nakao | 123/497 |
| 4,430,980 | 2/1984 | Pidgeon | 123/497 |
| 4,577,604 | 3/1986 | Hara | 123/497 |
| 4,791,905 | 12/1988 | Furuta | 123/497 |
| 4,827,897 | 5/1989 | Yamada | 123/497 |
| 4,919,102 | 4/1990 | Iwabuchi | 123/497 |
| 4,993,391 | 2/1991 | Kuribara | 123/497 |
| 5,044,344 | 9/1991 | Tuckey | 123/497 |

FOREIGN PATENT DOCUMENTS 3-61662   3/1991   Japan .

*Primary Examiner*—Carl S. Miller
*Attorney, Agent, or Firm*—Nikaido, Marmelstein, Murray & Oram

[57] ABSTRACT

A system for controlling an electric fuel pump housing a DC motor therein for an internal combustion engine using a gasoline-alcohol blend fuel. A switchover line is preestablished with respect to alcohol concentration in the fuel and operating condition of the engine such as an engine load, an engine speed or both the engine load and engine speed. If the detected condition exceeds the switchover line in a high engine load, a relay is energized so that battery voltage is supplied to the motor through a line bypassing a resistor provided at an initial power supply line. Voltage and hence current applied to the motor is thus increased to raise pump speed higher. Although the system construction is simple and low-cost, sufficient fuel can be supplied at the high engine load.

12 Claims, 6 Drawing Sheets

Alcohol concentration 0%

Alcohol concentration 85%

FUEL PUMP CONTROL SYSTEM FOR INTERNAL COMBUSTION ENGINE

This application is a continuation of application Ser. No. 07/968,889 filed Oct. 30, 1992 now abandoned.

BACKGROUND OF THE INVENTION

1. Field of the Invention

This invention relates to a system for controlling a fuel pump for an internal combustion engine, and more particularly to a system for controlling an electric fuel pump for an internal combustion engine which uses a gasoline-alcohol blend fuel.

2. Description of the Prior Art

In an engine, more amount of fuel is required when the engine is full throttle opening than that required in idling state. And when the engine uses a gasoline-alcohol blend fuel, since the stoichiometric air-fuel ratio of gasoline is 14.7:1 while that of alcohol, e.g. methanol is 6.4:1, the amount of fuel required increases as the ratio of alcohol to gasoline in the fuel increases. Thus, when the engine adopts fuel system, an electric fuel injection pump for pumping fuel from a fuel tank must be controlled so as to satisfy the above.

Japanese Laid-open Patent Publication No. 3(1991)-61662 teaches a system of this type in which the flow rate of the electric fuel pump is determined on the basis of the alcohol concentration in the fuel so as to supply the optimum amount of fuel at all times without delay in delivery.

In such a conventional system, however, since the pump flow rate is continually controlled in proportion to the alcohol concentration, the circuitry for controlling the electric fuel pump is complex and costly.

SUMMARY OF THE INVENTION

This invention was accomplished in the light of the aforesaid problem of the prior art system and has as its object to provide a simple, low-cost fuel pump control system, while without causing any delay in fuel delivery, for an internal combustion engine.

For realizing the object, the present invention provides a system for controlling a fuel pump having a motor for an internal combustion engine using a gasoline-alcohol blend fuel, comprising first means for detecting alcohol concentration in the fuel, second means for detecting operating condition of the engine, third means for comparing the detected engine operating condition with a predetermined limit defined with respect to the detected alcohol concentration, and control means for switching voltage to be applied to the motor from a power source to change pump speed at least in two speeds such that the pump is driven at a low speed if the detected engine operating condition is below the predetermined limit while the pump is driven at a high speed if the detected engine operating condition is above the predetermined limit.

DETAILED DESCRIPTION OF THE PREFERRED EMBODIMENTS

Embodiments of the invention will now be explained with reference to the attached drawings.

Figure 1:
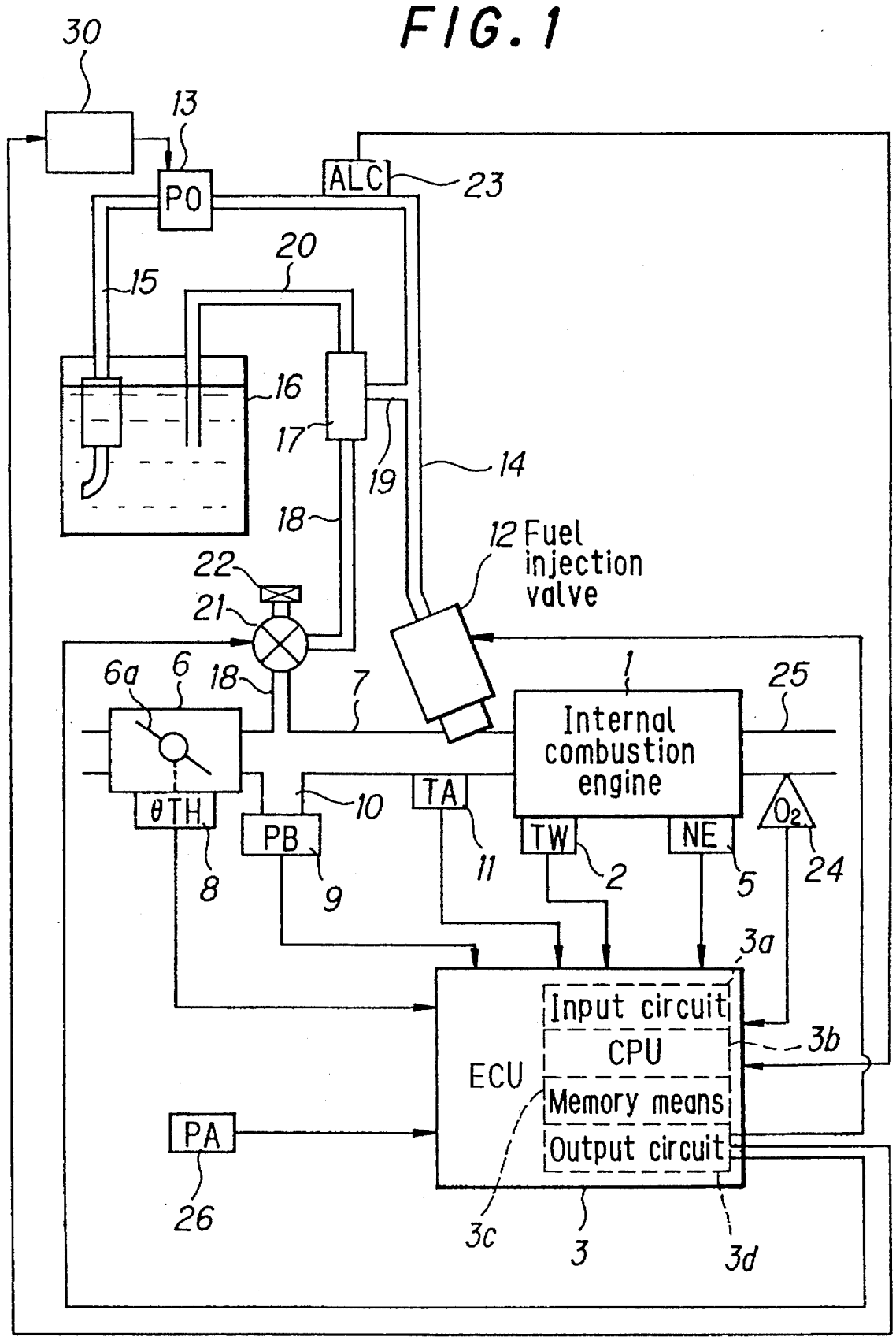
FIG. 1 is a schematic diagram showing a fuel pump control system for an internal combustion engine according to the invention.

As shown in FIG. 1, a coolant temperature sensor 2, shown as "TW" in the figure and made of a thermistor, for example, is provided on the cylinder block of an engine 1, more specifically, is attached to the wall of a coolant-filled jacket enclosing the cylinders of the engine 1 using a gasoline-alcohol blend fuel. The coolant temperature sensor 2 sends an electric signal representing the engine coolant temperature TW detected thereby to an electronic control unit (ECU) 3.

An engine speed sensor 5, shown as "NE" in the figure, is installed in the vicinity of the engine cam shaft (not shown) or crankshaft (not shown) and produces a pulse signal (TDC pulse signal) once every 180 degrees of crankshaft rotation, at prescribed crank angle positions. The TDC pulse signals are also forwarded to the ECU 3. A throttle body 6 is provided in an air intake passage 7 of the engine 1. A throttle valve 6a provided in the throttle body 6 is linked with a throttle position sensor 8, shown as "θTH", which produces and sends to the ECU 3 an electric signal representing the opening θTH of the throttle valve 6a detected thereby. An air intake pressure sensor 9, shown as "PB", is provided in a branch pipe 10 branching from the air intake passage 7 downstream of the throttle valve 6a. The PB sensor 9 produces and sends to the ECU 3 an electric signal representing the pressure PB at the intake passage downstream of the throttle valve 6a detected thereby. And, an intake air temperature sensor 11, shown as "TA", is mounted on the wall of the air intake passage 7 downstream of the branch pipe 10. The intake air temperature (TA) sensor 11 produces and sends to the ECU 3 an electric signal representing the intake air temperature TA detected thereby.

Each cylinder of the engine 1 is equipped with a fuel injection valve 12 that is located in the portion of the air intake passage 7 between the engine 1 and the throttle valve 6a at a position upstream of the cylinder's intake valve (not shown). The fuel injection valves 12 are connected with an electric fuel pump 13 through a first fuel supply pipe 14. The open time (injection period) of the fuel injection valves 12 is regulated by a drive signal from the ECU 3. A second fuel supply pipe 15 connects the fuel pump 14 with a fuel tank 16.

Reference numeral 17 designates a pressure regulator. The interior of the casing of the pressure regulator 17 is divided by a diaphragm (not shown) into a negative pressure chamber and a fuel chamber (neither shown). The negative pressure chamber is connected through a suction passage 18 with the air intake passage 7 at a position downstream of the throttle valve 6a. The fuel chamber is connected through a pipe 19 with the first fuel supply pipe 14 and through a return pipe 20 with the fuel tank 16. A pressure regulator control solenoid valve 21 is provided in the suction passage 18, which is constituted of a solenoid and a valve body driven by the solenoid (neither shown). The solenoid is electrically connected with the ECU 3 and with the ignition switch (not shown). When its solenoid is energized at a time, for example, the engine temperature TW is high, the pressure regulator control solenoid valve 21 communicates the negative pressure chamber of the pressure regulator 17 with the atmosphere via an air cleaner 22, increasing the fuel pressure in the first fuel supply pipe 14. Otherwise (i.e. when the solenoid is deenergized), it introduces the negative pressure downstream of the throttle valve 6a into the negative pressure chamber. The solenoid is normally de-energized and the pressure regulator 17 ordinarily opens and closes the valve body in response to the fuel pressure for regulating the amount of fuel returned to the fuel tank 16, in this way maintaining the difference between the fuel pressure in the first fuel supply pipe 14 and the pressure in the air intake passage 7 at a constant value.

Moreover, an alcohol concentration sensor 23, shown as "ALC", is installed in the inner wall of the first fuel supply pipe 14 at a point downstream of the fuel pump 13. The ALC sensor 23 produces and sends to the ECU 3 an electric signal representing the alcohol concentration ALC in the fuel detected thereby. And an $O_2$ sensor 24 is provided in an exhaust pipe 25 of the engine 1. The $O_2$ sensor 24 produces and sends to the ECU 3 an electric signal representing the oxygen content of the exhaust gas. The system is further provided with an atmospheric pressure sensor 26, shown as "PA", to detect the atmospheric pressure.

The ECU 3 has an input circuit 3a which functions to shape the wave forms of signals received from the sensors, adjust the signal voltages to a prescribed level, and convert the analog signals to digital signals. It also has a central processing unit (CPU) 3b, a memory means 3c consisting of a read-only memory (ROM) for storing certain tables and programs to be executed by the CPU 3b, a random access memory (RAM) for storing the results of computations and the like, and an output circuit 3d for outputting drive signals to the fuel injection valve 12 and the pressure regulator control solenoid valve 21.

In addition, the electric fuel pump 13 houses a DC motor therein which is similarly controlled by the ECU 3 through a circuit 30.

Figure 2:
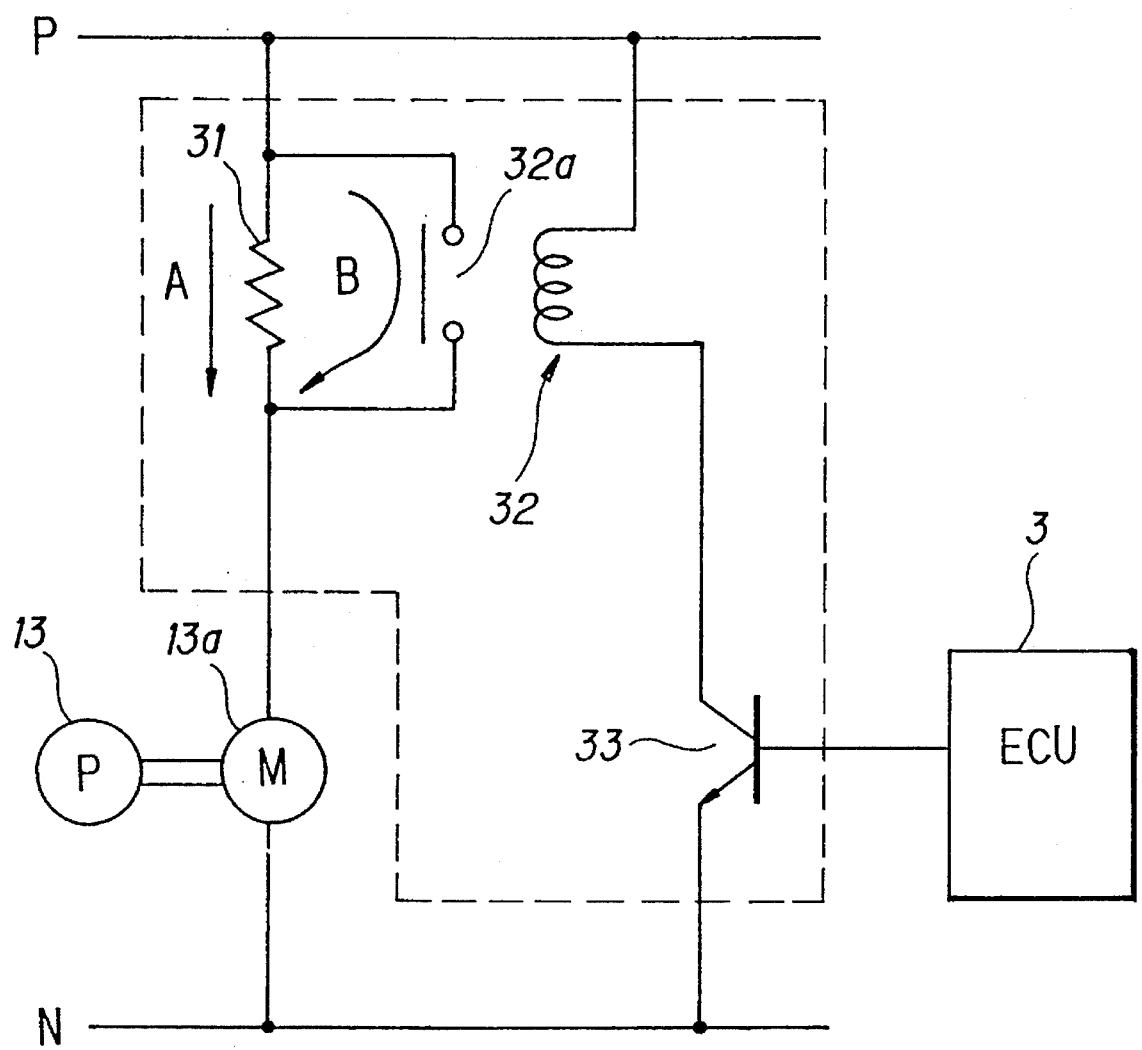
FIG. 2 is a diagram showing a fuel pump control circuit in FIG. 1 in detail.

FIG. 2 shows the details of the circuit 30. As shown, the voltage supply line from a battery (not shown) is branched off to bypass a resistor 31. A relay 32 is provided to normally open the contact 32a at the bypass line. Moreover, a transistor 33 is provided and its collector terminal is connected to the relay 32 and the base terminal to the ECU 3. When the voltage level supplied to the transistor base terminal from the ECU 3 is low (i.e. no current flows), the transistor 33 is OFF so that the battery voltage is supplied to the motor 13a through a line having the resistor 31 as marked by "A". When, on the other hand, current is supplied to the transistor base terminal from the ECU 3, the transistor 33 turns ON to energize the relay 32 which in turn closes the contact 32a. The power is then supplied to the motor 13a mainly along the bypass line as marked by "B" so that voltage applied to the motor 13a is increased by a value approximately corresponding to the voltage drop, which could otherwise occur, at the resistor 31 and hence, pump speed is raised to increase its flow rate. The ECU 3 thus controls the fuel pump at two speed modes to change the fuel amount to be supplied.

Figure 3:
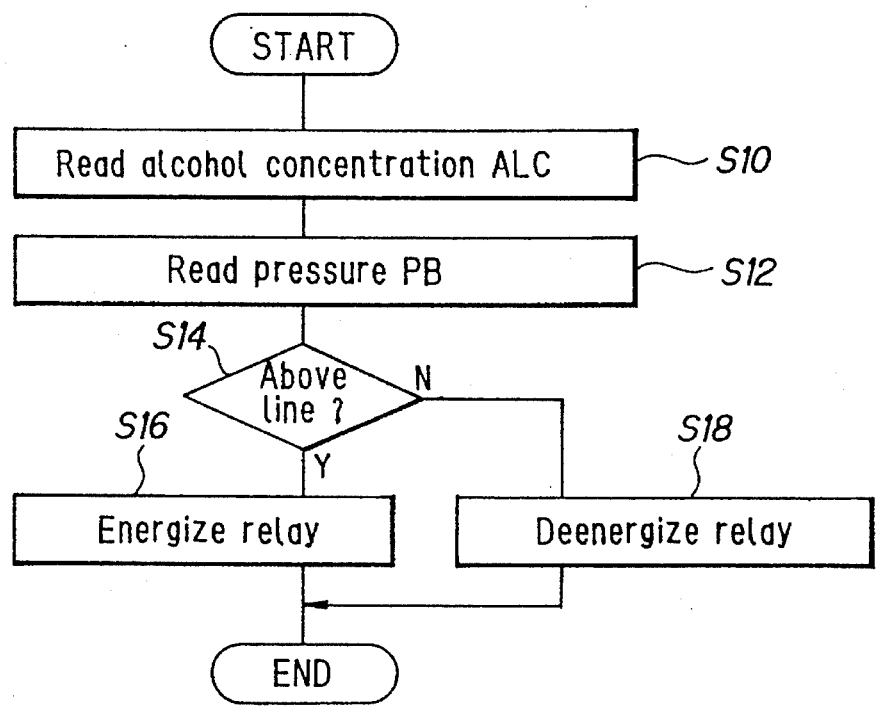
FIG. 3 is a flow chart showing the operation of the circuit.

The operation of the system in the manner will be explained with reference to FIG. 3 flow chart.

Figure 4:
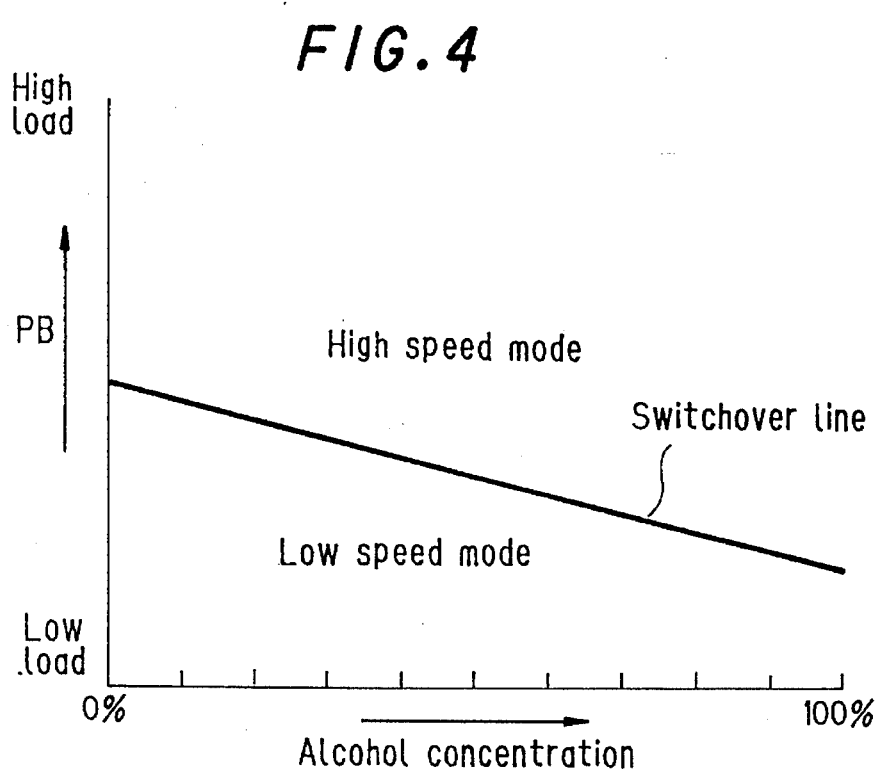
FIG. 4 is an explanatory view showing the characteristics of a look-up table referred to as in FIG. 3 flow chart.

The procedure begins at S10 in which the detected alcohol concentration ALC is read out and control passes to S12 in which a parameter indicative of an engine load such as the pressure PB in the air intake passage is read out. Control then passes to S14 in which a table, the characteristics of which is illustrated in FIG. 4, is looked up to determine if the manifold pressure PB in response to the alcohol concentration ALC is above the switchover line. If it is, control advances to S16 in which the relay 32 is energized such that the fuel pump 13 is driven in the high speed mode to supply more amount of fuel in the high engine load. If it is not, on the other hand, control passes to S18 in which the relay 32 is deenergized so that the fuel pump 13 is driven in the low speed mode to supply an amount of fuel less than that in the high speed mode.

As illustrated in FIG. 4, the switchover line drops as the alcohol concentration in the fuel increases. Therefore, even when the gasoline-alcohol blend fuel is used, sufficient amount of fuel can be supplied in the high engine load in response to the alcohol concentration in the fuel, without causing any delay in fuel delivery, while lesser amount of the fuel can be supplied to be enough in the low engine load in response also to the fuel's alcohol concentration. In addition, since the control circuit is arranged such that fuel pump is intermittently switched over between the two speed modes, the circuit is simple and low-cost.

It should be noted here that hysteresis may preferably provided for the switchover line so as to avoid hunting in control response.

Figure 5:
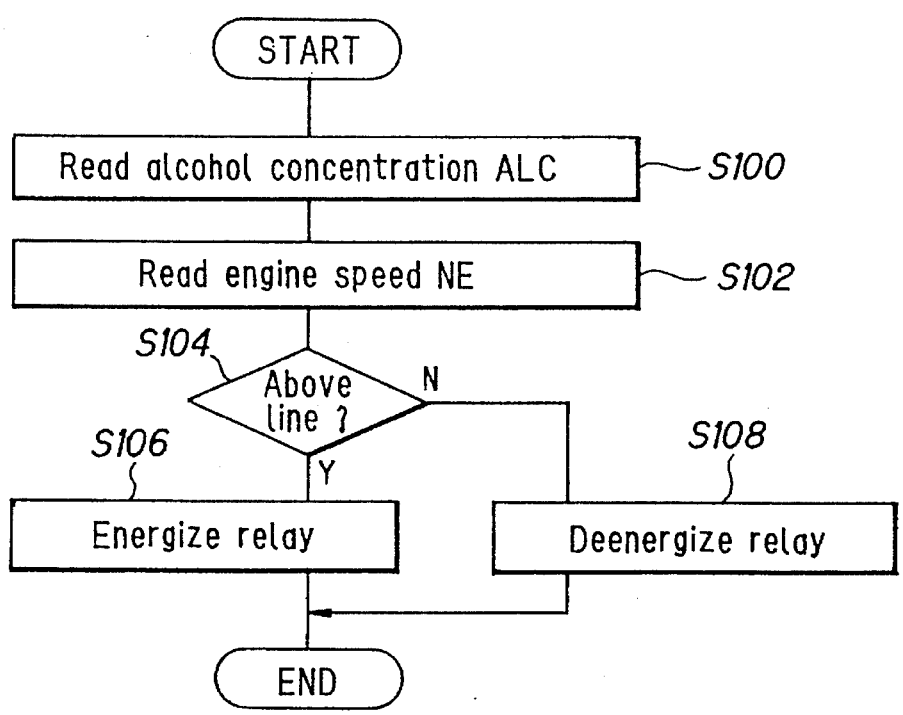
FIG. 5 is a flow chart similar to FIG. 3, but showing a second embodiment of the invention.
Figure 6:
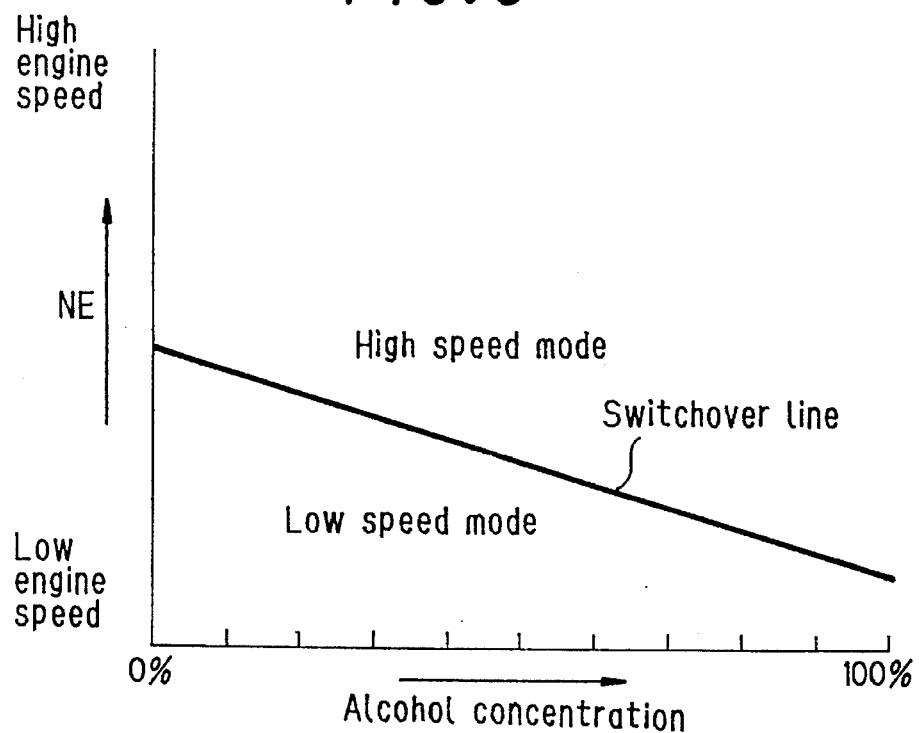
FIG. 6 is an explanatory view similar to FIG. 4, but showing the characteristics of a look-up table referred to as in FIG. 5 flow chart.

FIG. 5 is a flow chart showing a second embodiment of the invention. Putting an emphasis on the difference from the first embodiment, the alcohol concentration ALC and an engine speed NE are used to determine if the current engine operation is above a switchover line illustrated in FIG. 6 and based on the determination, the fuel pump is driven either at a low speed or at a high speed (S100–S108).

Figure 7:
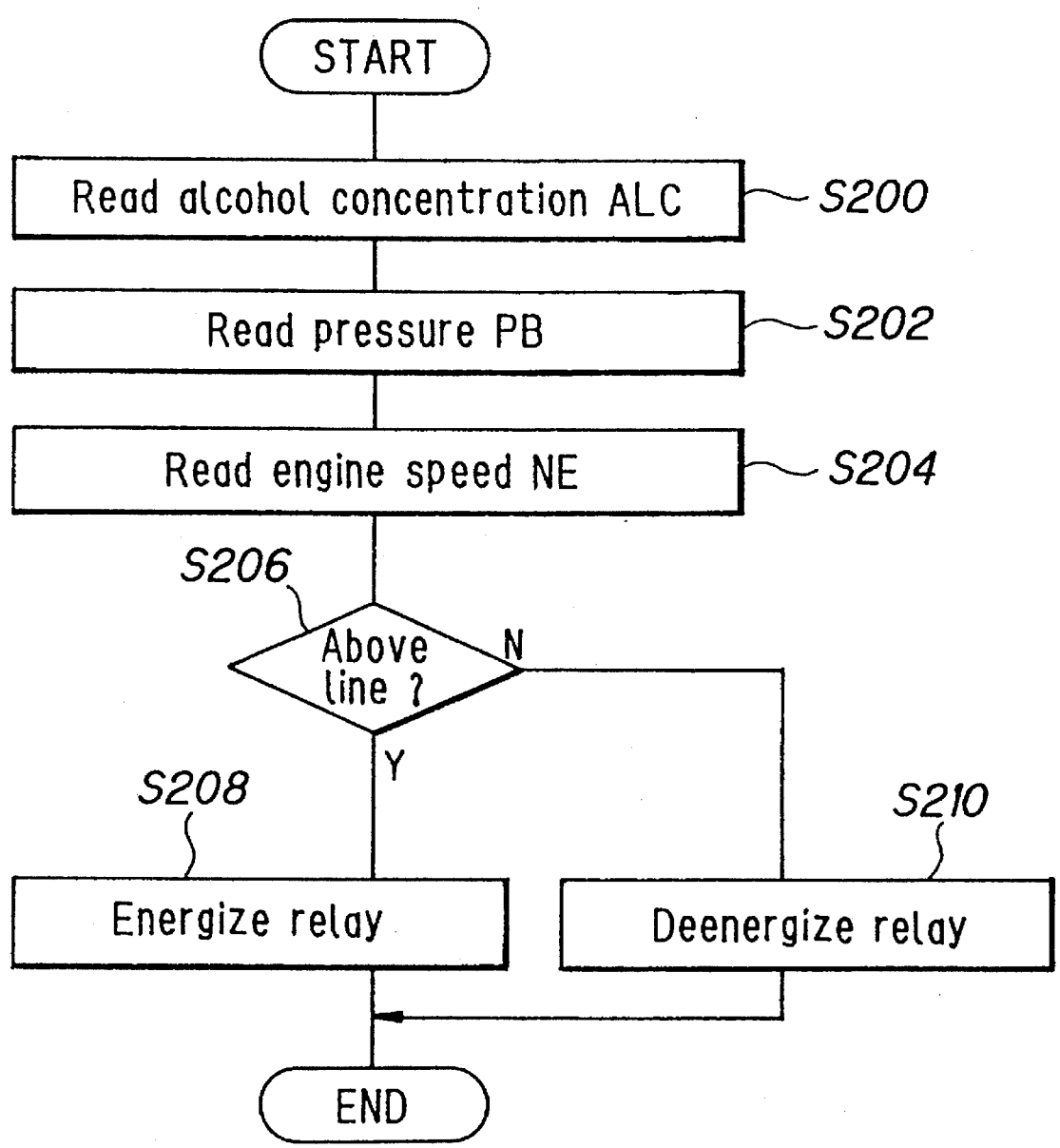
FIG. 7 is a flow chart similar to FIG. 3, but showing a third embodiment of the invention.
Figure 8:
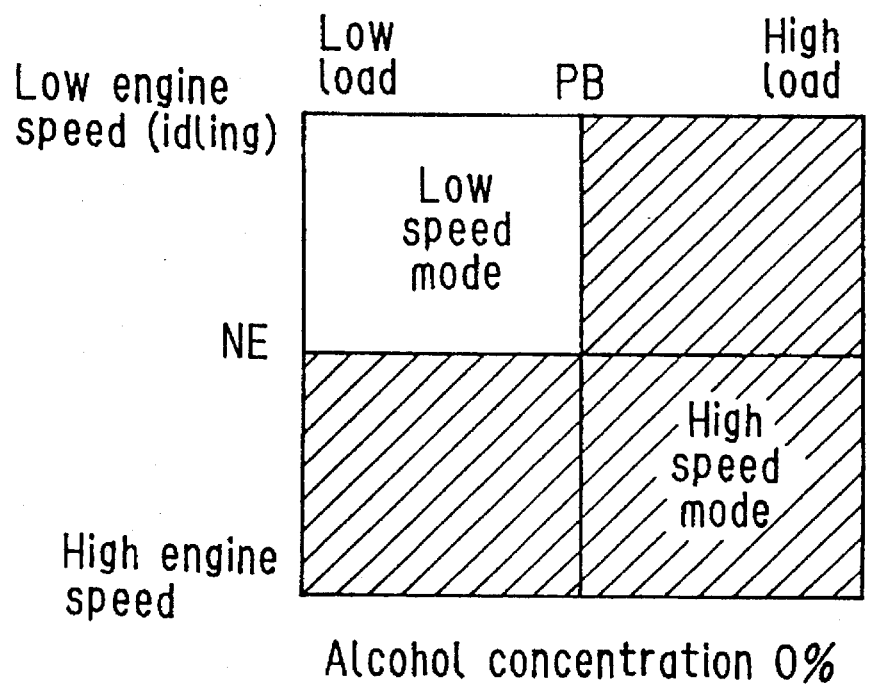
FIG. 8 is an explanatory view similar to FIG. 4, but showing the characteristics of a look-up table in alcohol concentration 0% to be used in FIG. 7 flow chart.
Figure 9:
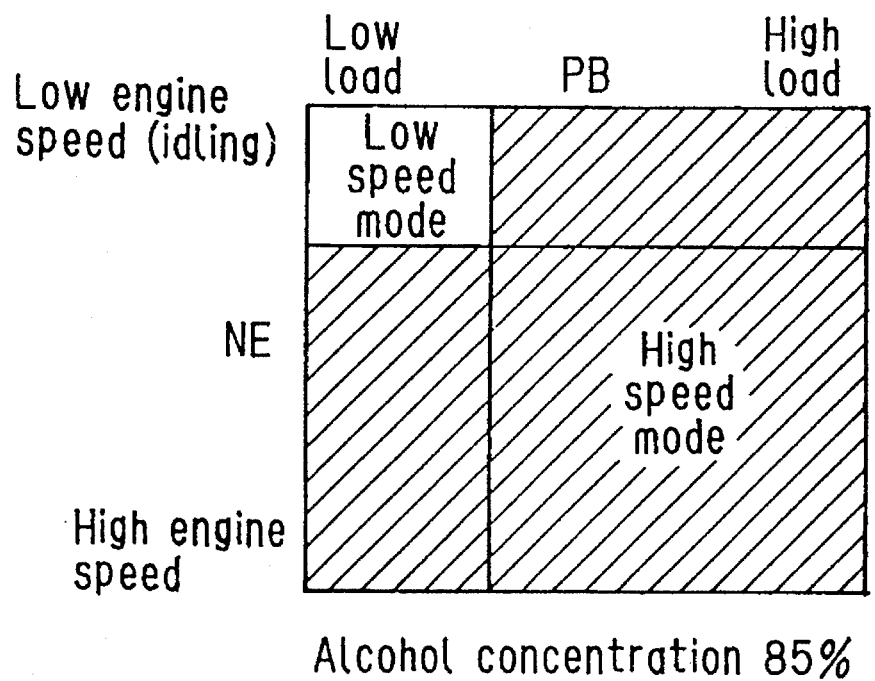
FIG. 9 is an explanatory view similar to FIG. 8 but showing that in alcohol concentration 85%.

FIG. 7 is a flow chart showing a third embodiment of the invention. In the third embodiment, both the pressure PB and the engine speed NE as well as the alcohol concentration ALC are used to determine if the current condition is above a switchover line (S200–S210). In the determination at S206, to be more specific, the look-up tables used in the first and second embodiments are again retrieved here to determine if the pressure PB and the engine speed NE in response each to the detected alcohol concentration ALC is above the respective switchover line. And if both are found to be above the lines,control passes to S208, while if both not, to S21. FIG. 8 shows the characteristics of the switchover line at alcohol concentration 0% and FIG. 9 shows that at alcohol concentration 85%, for example.

In the above, thus, by controlling the current or voltage supplied to the fuel pump motor 13a, the fuel pump is controlled to operate in a low speed (small flow rate) mode, or in the high speed (large flow rate) mode. It should, however, be noted that, instead of only two operating modes, it is possible to provide three operating modes such as low, medium and high speed modes, or even a large number of speed modes.

In addition, although an engine load is determined through the pressure at the air intake passage, it is alternatively possible to use an opening degree of the throttle valve or the like.

The present invention has thus been shown and described with reference to the specific embodiments. However, it should be noted that the present invention is in no way limited to the details of the described arrangements, but changes and modifications may be made without departing from the scope of the appended claims.

What is claimed is:

1. A system for controlling a fuel pump having a motor for an internal combustion engine using a gasoline-alcohol blend fuel, comprising:

first means for detecting alcohol concentration in the fuel;

second means for detecting operating condition of the engine;

third means for comparing the detected engine operating condition with a predetermined value defined with respect to the detected alcohol concentration; and control means for switching voltage to be applied to the motor from a power source to change pump speed between only two speeds such that the pump is driven at a low speed if the detected engine operating condition is below the predetermined value while the pump is driven at a high speed if the detected engine operating condition is above the predetermined value.

2. A system according to claim 1, wherein the engine operating condition is detected through an engine load.

3. A system according to claim 1, wherein the engine load is detected through a pressure at an air intake passage downstream of a throttle valve.

4. A system according to claim 1, wherein the engine operating condition is detected through an engine speed.

5. A system according to claim 1, wherein the engine operating condition is detected through an engine load and an engine speed.

6. A system according to claim 1, wherein the predetermined value decreases as the alcohol concentration in the fuel increases.

7. A system for controlling a fuel pump having a motor for an internal combustion engine using a gasoline-alcohol blend fuel, comprising:

first means for detecting alcohol concentration in the fuel;

second means for detecting operating condition of the engine;

third means for comparing the detected engine operating condition with a predetermined value defined with respect to the detected alcohol concentration; and control means having a relay which opens/closes a branch line bypassing a resistor provided at a power supply line connecting the motor from the power source, and said control means energizes the relay if the detected engine operating condition is above the predetermined value such that the power voltage is supplied along the branch line bypassing the resistor to drive the pump at a higher speed.

8. A system according to claim 7, wherein said control means has a transistor whose collector terminal is connected to the relay and turns on the transistor to energize the relay if the detected engine operating condition is above the predetermined value such that the power voltage is supplied along the branch line bypassing the resistor to drive the pump at the higher speed.

9. A system for controlling a fuel pump for an internal combustion engine using a gasoline-alcohol blend fuel, comprising:

alcohol concentration detecting means for detecting alcohol concentration in the fuel;

engine operation detecting means for detecting an operating condition of the engine;

threshold predetermining means for predetermining a threshold value with respect to the alcohol concentration detected by said alcohol concentration detecting means; and switchover means for switching over the fuel pump between a low speed mode in which the fuel pump is driven at a first supply amount and a high speed mode in which the fuel pump is driven at a second supply amount greater than the first supply amount, said switchover means switching the fuel pump to the low speed mode when the engine operating condition detected by said engine operation detecting means is less than the threshold value, while switching the fuel pump to the high speed mode when the engine operating condition is not less than the threshold value.

10. A system according to claim 9, wherein the threshold value decreases with increasing alcohol concentration.

11. A system according to claim 9, wherein the engine operating condition is detected through at least one of engine speed and engine load.

12. A system according to claim 10, wherein the engine operating condition is detected through at least one of engine speed and engine load.

* * * * *